United States Patent [19]

Ohnuki et al.

[11] 4,407,535

[45] Oct. 4, 1983

[54] CONTAINER-LOCKING MECHANISM

[75] Inventors: Katsutoshi Ohnuki; Yasuo Suzuki, both of Tokyo, Japan

[73] Assignee: Nippon Electric Co., Ltd., Tokyo, Japan

[21] Appl. No.: 345,207

[22] Filed: Feb. 3, 1982

[30] Foreign Application Priority Data

Feb. 16, 1981 [JP] Japan .......................... 56-20333[U]
Jul. 23, 1981 [JP] Japan ......................... 56-109525[U]

[51] Int. Cl.³ .................... E05C 3/06; E05C 3/16; E05C 7/00
[52] U.S. Cl. ........................... 292/27; 292/30; 292/49; 292/53
[58] Field of Search ................ 292/27, 30, 49, 53, 292/336.3; 229/39 R, DIG. 3

[56] References Cited

U.S. PATENT DOCUMENTS

| | | | |
|---|---|---|---|
| 969,776 | 9/1910 | Foley | 292/49 |
| 1,534,340 | 4/1925 | Bermotow | 292/49 |
| 2,037,347 | 4/1936 | Shoop | 292/27 |
| 4,238,068 | 12/1980 | Ellerbe | 229/39 R |

FOREIGN PATENT DOCUMENTS 651365 11/1928 France .......................... 292/30

*Primary Examiner*—Robert L. Wolfe
*Attorney, Agent, or Firm*—Laff, Whitesel, Conte & Saret

[57] ABSTRACT

A container-locking mechanism for locking two perforated overlapping sections of a carbon or the like. An outer tubular member is fitted into the aligned holes in the sections and formed at one end with a radially outwardly extending flange. An inner tubular member has a plurality of circumferentially spaced tapered portions. The inner tubular member is locked in a position when fully inserted in the outer tubular member. The outer tubular member has a plurality of arms arranged to be engaged and forced radially outwardly beyond the outer peripheral surface of the outer tubular member, by the tapered portions, when the inner tubular member is inserted into the outer tubular member.

13 Claims, 13 Drawing Figures

CONTAINER-LOCKING MECHANISM

This invention relates to a container-locking mechanism for locking a carton or similar container formed of sheet material, such as paperboard.

Conventionally, the closure flap or flaps of a container of the type described above, are locked by means of adhesive tapes, staples, bands or the like means; or, the container is itself designed with a self-locking type closure, for example, as disclosed in the U.S. Pat. No. 4,238,068.

Such conventional locking means as mentioned above, however, is not reusable since, once put to use, it is destroyed when the container is opened and is not adaptably used for containers intended for repeated use.

On the other hand, a reusable type of closure locking mechanism is disclosed in the Japanese Patent Publication No. 26569/1974. This mechanism, however, is complicated with a large number of component parts, requiring an undesirably large amount of time and labor, when most of its parts are premliminarily assembled into holes formed in the closure flap and a side wall of a carton.

One object of the present invention is, therefore, to provide a new and improved reusable type container-locking mechanism free from the above-mentioned disadvantages of the prior art mechanisms.

According to the present invention, a container-locking mechanism locks two perforated overlapping sections of a carton or the like the locking mechanism comprises an outer tubular member adapted to be fitted into aligned holes in the sections of the container. One end of the member is formed with a radially outwardly extending flange. An inner tubular member has, formed at one end, a plurality of circumferentially spaced tapered portions. A locking means locks the inner tubular member in a position which is fully inserted in the outer tubular member. The outer tubular member is provided at the other end with a plurality of arms which are radially arranged to be engaged and forced radially outwardly beyond the outer peripheral surface of the outer tubular. The force is applied member by the tapered portions when the inner tubular member is fittingly inserted into the outer tubular member, as previously fitted in the aligned holes in the overlapping sections. This clamps the sections against each other in cooperation with the flange on the outer tubular member.

The features and advantages of the present invention will become apparent from the following description when taken in conjunction with the accompanying drawings in which.

Figure 1A:
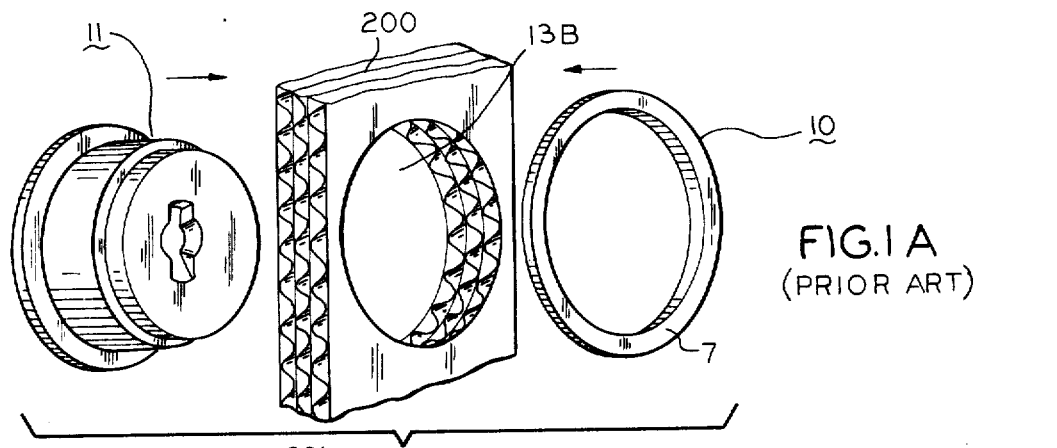
FIGS. 1A to 1E show perspective views of a conventional locking mechanism described in the Japanese Patent Publication No. 26569/1974.
Figure 1B:
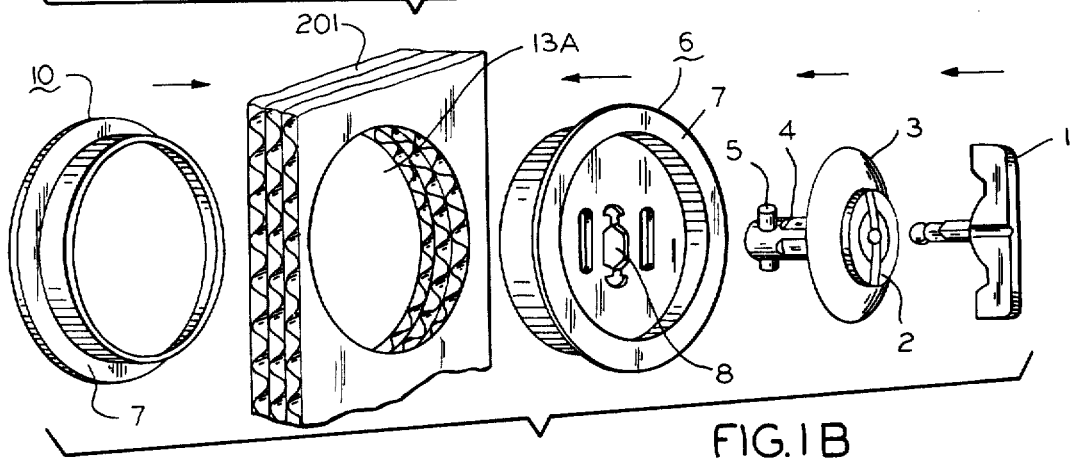

Referring first to FIGS. 1A to 1E, a conventional reusable locking mechanism includes a pair of mating components, one being shown in FIG. 1A and the other in FIG. 1B, each including a flanged cup 11 or 6. Paperboard or corrugated cardboard sections 200 and 201 are parts of a carton formed with through holes 13B and 13A of an inside diameter which is substantially the same.

Figure 1C:
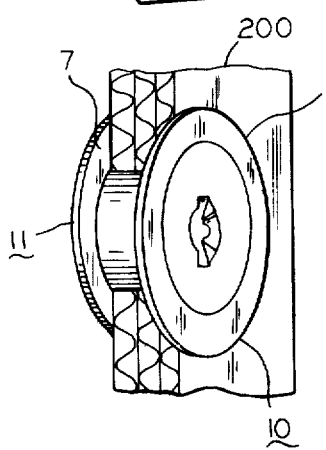
Figure 1D:
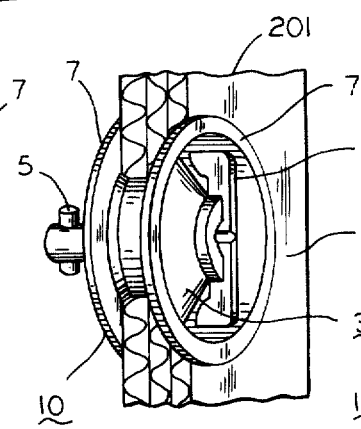

As the outer diameter of the cups 11 and 6. As indicated by the arrows in FIG. 1B, the cup 6 is inserted into the hole 13A in the section 201, from the outside thereof. A flanged retaining ring 10 is inserted into the same hole 13A from the inside of the section 201. Sections 201 is a closure flap of the carton, to be laid on the outside of the other section 200, which is either another closure flap or a side wall of the carton. In this manner, the cup 6 and the ring 10 are brought into engagement with each other, clamping their flanges 7 against the opposite surfaces of the section 201 as shown in FIG. 1D. A rotor 3 is then fitted to the cup 6 by inserting the shaft 4 (FIG. 1B) of the rotor 3 into a hole 8 formed centrally in the bottom of the cup 6.

Referring next to FIG. 1A, the flanged cup 11 is inserted into the hole 13B in the section 200 with insertions being from the inside thereof. The ring 10 is inserted into the same hole 13B from the outside of the section 200. As the cup 11 and retaining ring 10 engage each other, their flanges 7 are clamped against the opposite sides of the section 200 as shown in FIG. 1C.

Figure 1E:
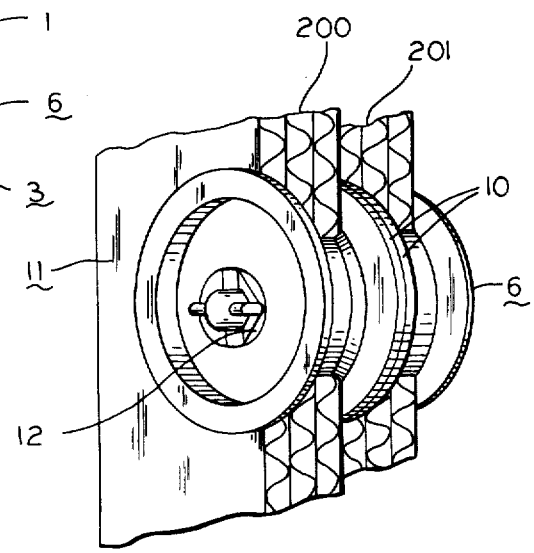

Referring to FIGS. 1B and 1D, the shaft 4 of the rotor 3 has at its forward end, a pair of lugs 5, while the bottom of the cup 11 is provided with a slot (see FIGS. 1A and 1C) and with a pair of ledges 12 on the opposite sides of the slot (see FIG. 1E).

Figure 2:
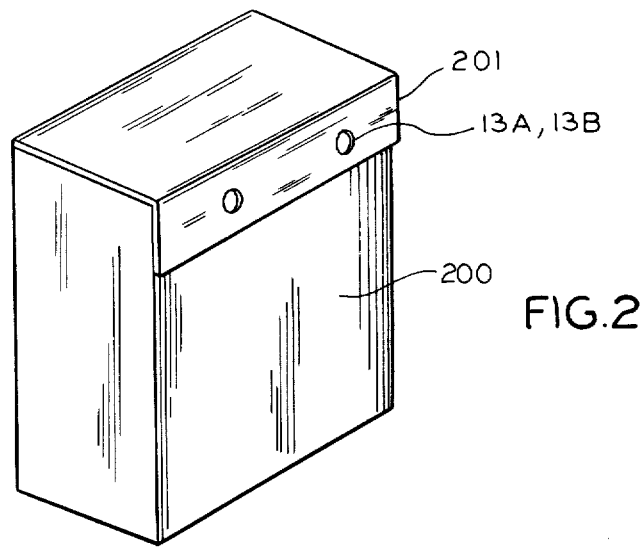
FIG. 2 is a perspective view illustrating a carton to be locked by the conventional mechanism.

To close the carton, first the inside and outside sections 200 and 201 are laid on each other as shown FIG. 2, so that the rings 10 are brought into contact with each other, in an aligned relationship as indicated in FIG. 1E. A wing key 1 is then fitted into a key hole 2 (FIG. 1B) axially formed in the rotor 3 and rotated through an angle of about 90 degrees. It is to be noted here that, when the sections 200 and 201 are properly laid on each other, the flanged cups 6 and 11 are brought close to each other. The shaft 4 with the lugs 5 formed thereon is passed through the slot in the bottom of the cup 11. Subsequently, when the rotor 3 is rotated with key 1, the lugs 5 ride on the opposed ledges 12 formed inside of the bottom of the cup 11. The mating components assembled on the respective sections 200 and 201 are secured in place to fix the sections 200 and 201.

It will be apparent that the coupled paperboard sections can be readily unlocked simply by rotating the key 1, either forward or backward through 90 degrees.

As will be readily noted, however, such a conventional locking mechanism is complicated, requiring much labor for its application to and removal from the container sections.

Figure 3:
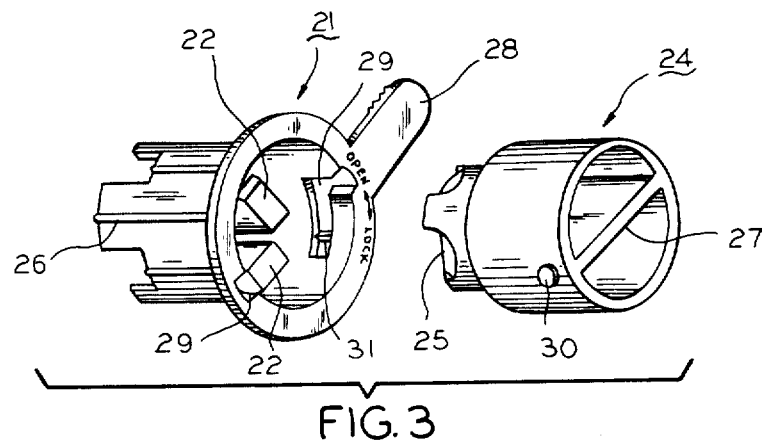
FIG. 3 is a perspective view illustrating a preferred embodiment of the present invention.

Referring now to FIG. 3, an embodiment of the invention comprises (two outer and inner) tubular members 21 and 24 to be inserted in that order, into the aligned holes in the two paperboard sections laid one on the other. The member 21 has, at its forward end, a plurality of radially arranged arms 22 and, at the other end, a radially outwardly extending flange 23. Formed in the inner peripheral surface of the member 21 are a plurality of circumferentially spaced L-shaped guide grooves 29. These grooves extend from the edge of the other end of the outer member 21. Each of these grooves has, in the vicinity of its terminal end, a protrusion 31 extending transversely thereof. The member 21 also has on its outer peripheral surface a plurality of circumferentially spaced axially extending antiskid ridges 26. Reference numeral 28 indicates a fin formed integrally with the flange 23 for use in removing the member 21 after it has once been applied to the overlapping paperboard sections.

The forward end of inner member 24 is closed, with a plurality of circumferentially spaced tapered portions 25 formed around its peripheral edge. The portions 25 are, when the member 24 is inserted into the member 21, brought into sliding engagement with the respective arms 22 which are forced radially outwardly, beyond the outer peripheral surface of the member 21, as will be described below in detail. On the outer peripheral surface of the member 24 are a plurality of circumferentially spaced radial projections 30. These projections 30 are designed to engage the respective grooves 29 formed inside the member 21. Reference numeral 27 indicates a rotating member having a plate-like shape, within the member 24 for the rotation thereof.

A description will next be made of the use and operation of the embodiment described above.

Figure 4:
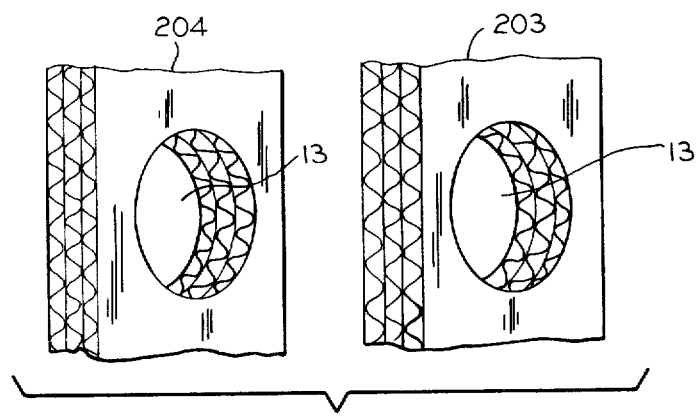
FIG. 4 is a perspective view illustrating a closure flap and a side wall of a carton to be coupled by the mechanism shown in FIG. 3.
Figure 5A:
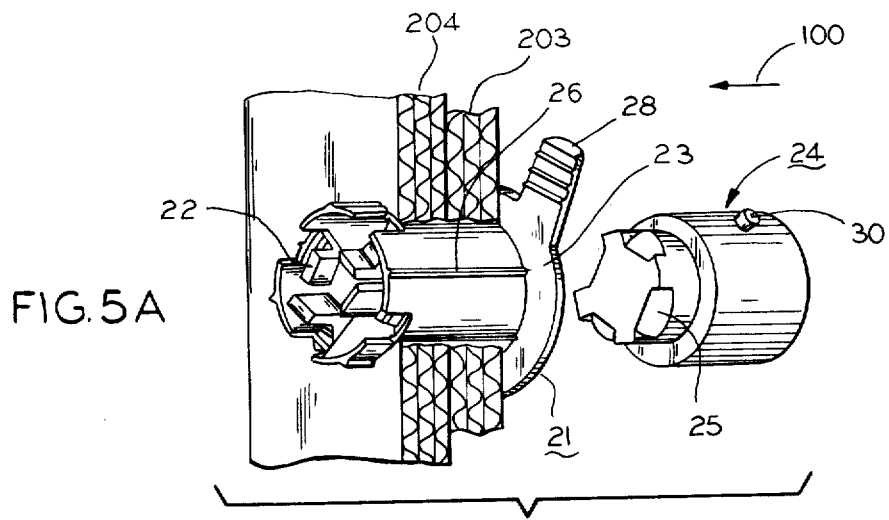
FIGS. 5A, 5B and 5C are perspective views describing the operation of the embodiment shown in FIG. 3.
Figure 5B:
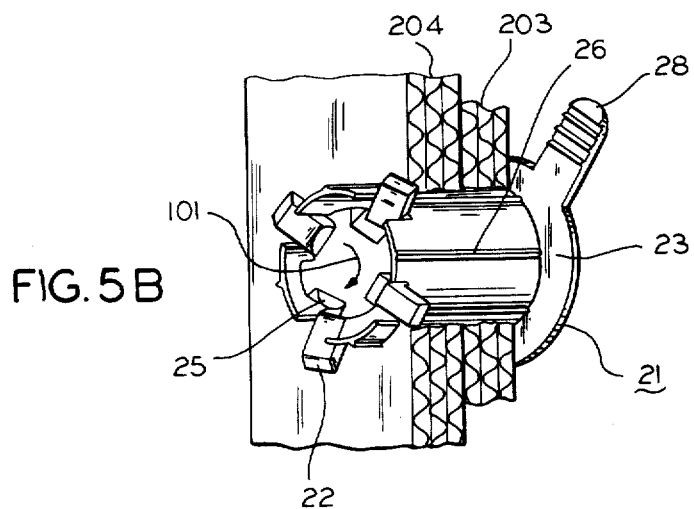
Figure 6A:
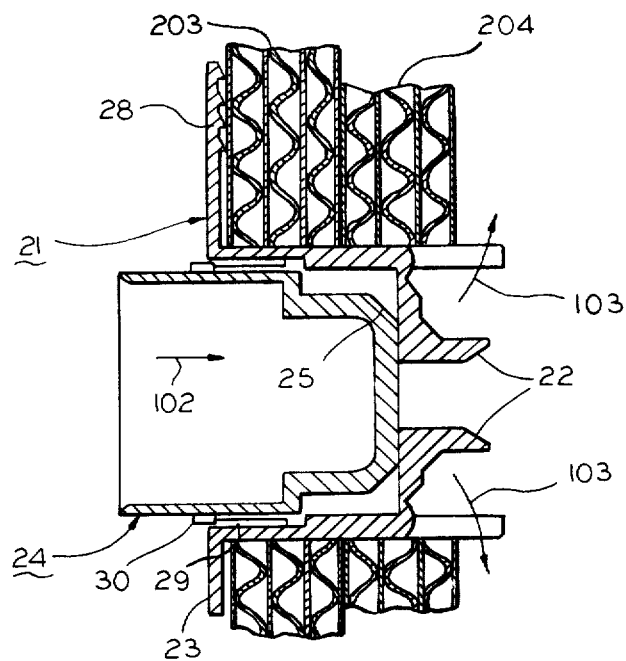
FIGS. 6A and 6B are cross-sectional views describing the operation of a part of the embodiment.
Figure 6B:
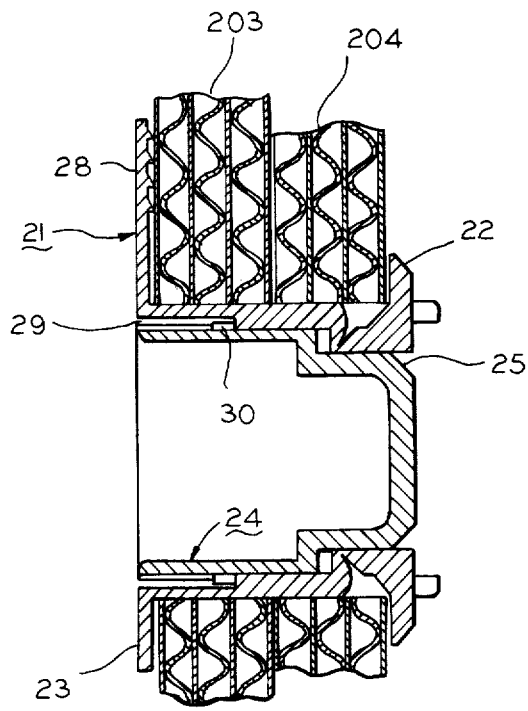

Referring to FIG. 4, paperboard sections 203 and 204 serve as a closure flap and a side wall, respectively, of a carton or the like. These sections 203 and 204 have a through hole 13 formed therein and a diameter which is substantially the same as the outer diameter of the member 21. In use, first the flap 203 is laid on the side wall 204 in an overlapping relationship so that the holes 13 are aligned with each other. The member 21 is then inserted into the aligned holes 13, in the direction of the arrow 100, until the end flange 23 engages the outside surface of the flap 203 (see FIG. 5A). Subsequently, as seen in FIGS. 5B, 6A and 6B, the member 24 is inserted into the member 21, in the direction of the arrow 102 (FIG. 6A). This insertion swings out the radially arranged arms 22 on the inside of the member 21, so that the arms extend radially outwardly beyond the outer peripheral surface of the member 21, as indicated in FIG. 6A by the arrows 103.

Finally, by riding on and over the tapered portions 25, formed around the forward end of the member 24, the arms 22 come to be securely held on the adjacent peripheral surface of the member 24 with their free end portions extending radially outwardly along the inside surface of the side wall 204 (see FIG. 6B). In this manner, the closure flap 203 and the side wall 204 of the carton are held clamped between the arms 22 (which are swung by the insertion of the member 24 into the member 21 and the flange portion 23 of the member 21).

Figure 5C:
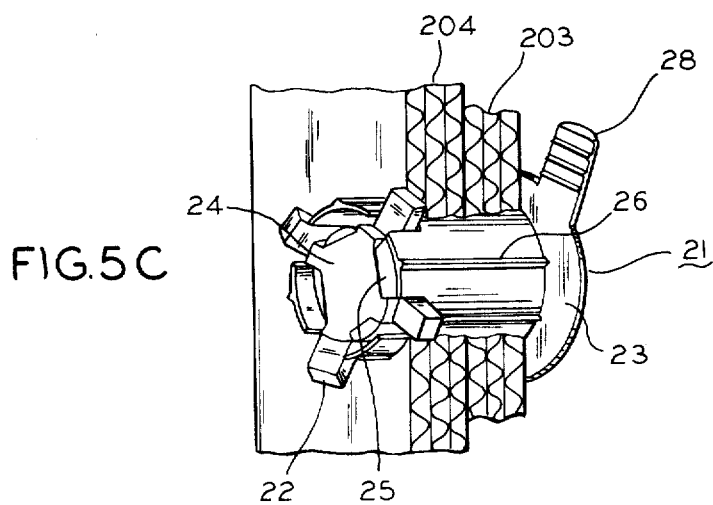

To complete the locking operation, the member 24 is rotated (by the rotating member 27 FIG. 3) in the direction of the arrow 101 in FIG. 5B. Rotation continues until the radial projections 30 are slidably received in the grooves 29 inside of the member 21 and pass over the respective protrusions 31 formed in the grooves 29. Projections 30 come to rest in the adjacent end spaces at one end of groove 29, so that the member 24 is effectively prevented from inadvertently coming out of the member 21. Further upon this rotating operation, the land portions between the tapered portions, 25 of the member 24, are brought into alignment with the arms 22 as indicated in FIG. 5C, further ensuring that the arms 22 are positively held locked in their swungout positions. It will be readily understood that the ridges 26 on the member 21 prevent it from rotating with the member 24, as the latter is rotated.

In this manner, the inner member 24 is locked in the outer member 21 and the arms 22 are locked in their operative position, thus completing the closure locking operation.

The closed carton can readily be opened by proceeding substantially in just the reverse order to the order described above. First, the inner member 24 is rotated reversely to be released from the outer member 21 and drawn out thereof. The arms 22 are free to swing back to their original position inside the member 21. The member 24 is then drawn out of the aligned holes 13 in sections 203 and 204 by pulling on the fin 28. Now the closure flap 203 can obviously be freely lifted away from the side wall 204 to open the carton.

It will be appreciated from the foregoing that our invention is applicable to the closure sections of a carton or the like with extreme ease, to achieve the highly efficient container opening and closing operation.

What is claimed is:

1. A container-locking mechanism for locking two overlapping sections of a carton, or the like, each section having a hole, with the two holes in alignment when said two sections are in a closed position, the mechanism comprising: an outer tubular member adapted to be fitted into the aligned holes in the overlapping sections, one end of said tubular member having a radially outwardly extending flange; an inner tubular member having at one end a plurality of circumferentially spaced tapered portions, said outer tubular member having at the other end a plurality of radially arranged arms, said tapering portions engaging said arms and forcing said arm radially outwardly beyond the outer peripheral surface of said outer tubular member when the inner tubular member is fittingly inserted into the outer tubular member while said outer member is fitted in the aligned holes in the overlapping sections, to clamp said sections against each other in cooperation with said flange on the outer tubular member; and locking means for locking the inner tubular member in a position fully inserted into the outer tubular member.

2. A container-locking mechanism as claimed in claim 1, in which said locking means include at least one projection formed on the outer peripheral surface of the inner tubular member and at least one guide groove formed in the inner peripheral surface of the outer tubular member to slidably receive said projection.

3. A container-locking mechanism as claimed in claim 2, in which said guide groove is substantially L-shaped.

4. A container-locking mechanism as claimed in claim 2 or 3, in which the bottom wall of said guide groove has a protrusion extending transversely thereof for capturing said projection.

5. A container-locking mechanism as claimed in claim 1, in which the other end of said inner tubular member has a plate-like rotation member for rotating said inner member about its axis while said outer tubular member has a plurality of antiskid ridges for restraining the rotation of the outer tubular member responsive to the rotation of said inner tubular member.

6. A carton lock comprising inner and outer telescoping members, said outer member having a flange on one end and radially disposed arms pivotally formed on the other end, said arms being normally contained within said outer member, said inner member having a handle on one end and a plurality of tapered sections on the other end, said tapered sections being formed at positions which engage said arms when said inner member is inserted into said outer member and telescoped to a closed position, the tapered sections engaging and pivoting said arms from the positions within the outer member to an extended position, whereby a locked member may be captured between said flange and said extended arms, said arms and non-tapered sections at the other end of said inner member being shaped to lock said arms in said extended position responsive to a rotation of said handle.

7. The carton lock of claim 6 and means on the sliding surfaces of said telescoping members for interlocking the relative positions of said members when said arms are in said extended positions.

8. The carton lock of claim 7 wherein said interlocking means comprise a bayonet base of opposed pins formed on said inner member and substantially L-shaped slots on said outer means for capturing said pins.

9. The carton lock of claim 8 and detent means within said L-shaped slot for capturing said pins near the end of the excersion allowed by said L-shaped slot.

10. The carton lock of any one of the claims 6-9 wherein said handle is recessed within said inner tube.

11. The carton lock of any one of the claims 6-9 and antiskid ridges formed on the outside surface of said outer member.

12. The carton lock of any one of the claims 6-9 and means formed on said outer member to facilitate a removal of said outer member.

13. The carton lock of claim 12 wherein said flange on said outer member extends completely around the periphery thereof, and said fin means is an elongation of said flange.

* * * * *